United States Patent [19]
Reinhardt et al.

[11] Patent Number: 4,577,139
[45] Date of Patent: Mar. 18, 1986

[54] COMMUTATORLESS D.C. MOTOR WITH THREE-STRAND FULL-PITCHED STATOR WINDING

[75] Inventors: Wilhelm Reinhardt, Schrozberg; Helmut Lipp, Hohebach, both of Fed. Rep. of Germany

[73] Assignee: EBM Elektrobau Mulfingen GmbH & Co., Fed. Rep. of Germany

[21] Appl. No.: 635,050

[22] Filed: Jul. 27, 1984

[30] Foreign Application Priority Data

Aug. 30, 1983 [DE] Fed. Rep. of Germany ....... 3331194

[51] Int. Cl.$^4$ ............................................. H02K 29/08
[52] U.S. Cl. ................................. 318/254; 310/68 R; 310/181; 310/184
[58] Field of Search ............ 310/40 MM, 67 R, 68 R, 310/156, 180, 181, 184; 318/138, 254, 439, 254 A

[56] References Cited

U.S. PATENT DOCUMENTS

| | | | |
|---|---|---|---|
| 3,230,434 | 1/1966 | Bauerlein | 318/254 A X |
| 4,019,075 | 4/1977 | Kagami | 310/40 MM |
| 4,130,769 | 12/1978 | Karube | 310/156 X |
| 4,217,508 | 8/1980 | Uzuka | 310/67 R X |

FOREIGN PATENT DOCUMENTS

| | | | |
|---|---|---|---|
| 54-99910 | 8/1979 | Japan | 310/67 R |
| 55-74394 | 6/1980 | Japan | 318/254 |
| 57-97357 | 6/1982 | Japan | 318/254 |

OTHER PUBLICATIONS

Sprague Engineering Bulletin, Bipolar Hall Effect Digital Switches UGN-3030 T/U and UGS-3030T/U.

Primary Examiner—William M. Shoop, Jr.
Assistant Examiner—Bentsu Ro
Attorney, Agent, or Firm—Jones & Askew

[57] ABSTRACT

A commutatorless D.C. motor with cylindrical air gap, consisting of a stator with three stator winding strands displaced by 120° electrical and with a permanent-magnetic external rotor with at least $p=1$ pairs of poles and with $N=2p\times 3$ winding slots in the stator as well as with at least two rotation position detectors composed of Hall generators, which switch on and off the individual winding strands depending on the rotation position of the rotor, in which connection the rotor (7) exhibits $p=2$ or $p=4$ pairs of poles, and the stator windings are full pitch, also each winding strand (3,4,5) is subdivided into $w=2p$ winding sections, whose central axes exhibit a separation of 180° electrical, viewed in the direction of rotation, and the direction of winding of the winding sections is such that at the periphery of the stator (1) alternating North and South poles, viewed in the direction of rotation, are produced by the winding sections.

The rotor magnet 7 is magnetized with four poles and is provided with the cut-outs 8 of 50°–60°0 electrical depicted in FIG. 4.

4 Claims, 5 Drawing Figures

COMMUTATORLESS D.C. MOTOR WITH THREE-STRAND FULL-PITCHED STATOR WINDING

FIELD OF THE INVENTION

The invention under consideration concerns a commutatorless D.C. motor with cylindrical air gap, consisting of a stator with three winding strands displaced by 120° electrical and with a permanent magnetic external rotor with at least $p=1$ pairs of poles and $N=2p\times 3$ winding slots in the stator as well as with at least two rotation position detectors composed of Hall generators which switch on and off the individual winding strands depending on the rotation position of the rotor.

A D.C. motor of this sort is known from DE-PS No. 25 47 764. With this traditional three-strand commutatorless D.C. motor the problem arises that, because of the unsymmetrical bearing loads resulting from the switchingon of the individual windings, the operational life of the motor is very severely reduced. Also, while the motor is starting up, a starting noise arises which makes itself noticeable in a disturbing manner.

The purpose underlying the invention, then, is to improve the D.C. motor described above in such a way that it has high efficiency and that its bearing load is distributed equally over the periphery of the bearing or (as the case may be) the shaft, and in which there are no disturbing starting noises.

SUMMARY OF THE INVENTION

According to the invention, this is attained by reason of the fact that the rotor exhibits $p=2$ or $p=4$ pairs of poles and the stator windings are fullpitched, as well as that each winding strand is subdivided into $w=2p$ winding sections, whose central axes exhibit a separation of 180° electrical viewed in the direction of rotation, and the direction of winding of the winding sections is such that, at the periphery of the stator, North and South Poles, viewed in the direction of rotation, are produced by the winding sections. According to the invention, 2p poles arise thereby at the periphery of the bundle of stator laminations, whose polarity is directed in such a way that North and South poles at the periphery of the bundle of stator laminations alternate. This results in a lower stray flux and a better symmetry of the field strength distribution. Furthermore, the invention brings with it the advantage that the height of the coil end can be reduced and in addition a better and more uniform weight distribution is attained. By this means the efficiency of the motor is improved and the bearing load is reduced because of the more uniform distribution of the winding.

In course of this, it is expedient, according to the invention, for three digitally switching Hall-I.C. preferably, to be used to control the commutation, which are displaced vis-a-vis one another by 120° electrical at any given time. Following on this, according to the invention, a rotation position detector is assigned to each winding strand, and a 3xp pulse operation of the motor according to the invention is obtained, i.e. 3xp current impulses per rotor revolution are delivered to its windings. Correspondingly, six-pulse operation is obtained for the four-pole motor with the number of pole pairs $p=2$ and twelve-pulse operation for the eight-pole motor with the number of pole pairs $p=4$.

Further useful forms of embodiment of the invention are contained in the subordinate claims.

BRIEF DESCRIPTION OF THE DRAWING

The invention is explained in more detail by means of the examples of implementation depicted in the appended diagrams. These show.

DESCRIPTION OF THE PREFERRED EMBODIMENTS

Figure 1:
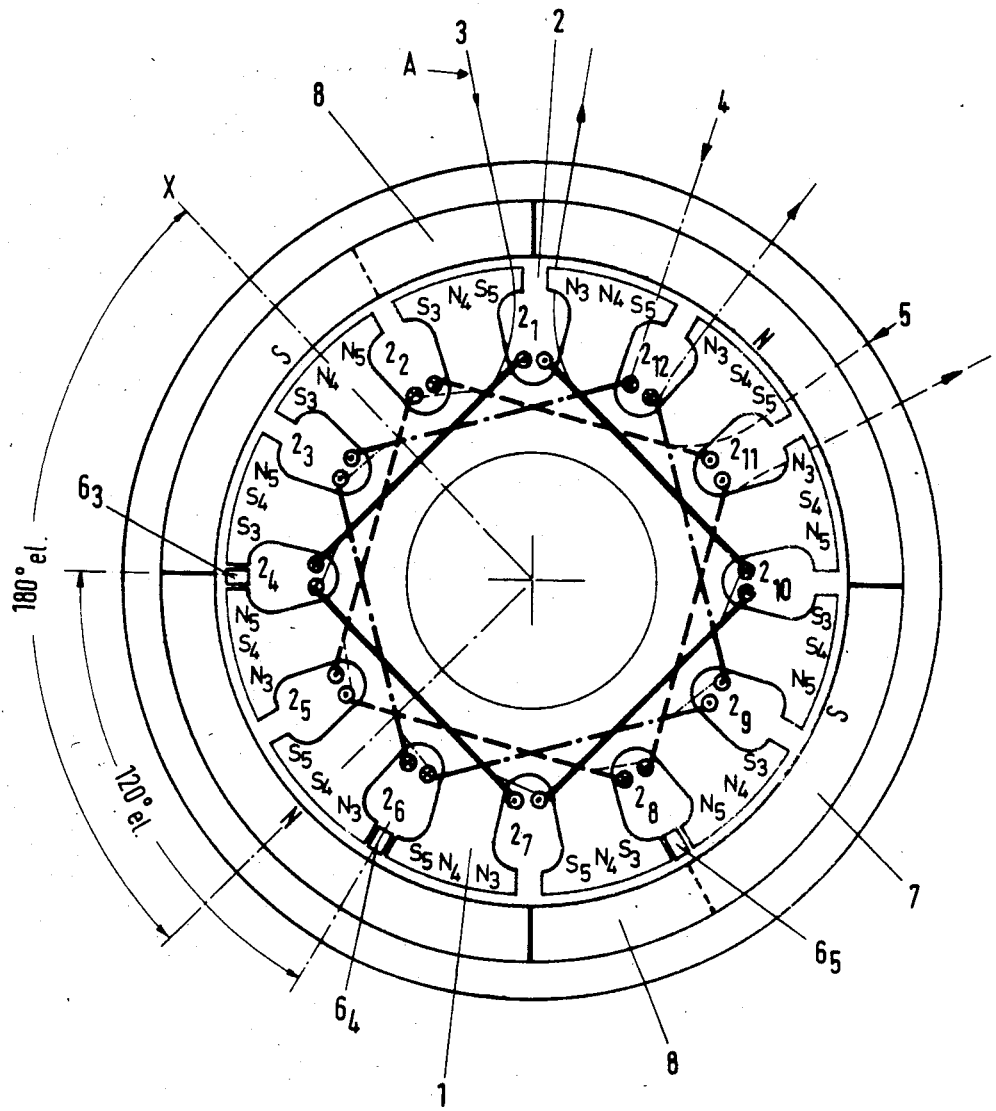
FIG. 1 a winding pattern of motor in accordance with the invention, with 12 slots, FIG. 2 a winding pattern of a motor in accordance with the invention, with 24 slots, FIG. 3 the basic circuit diagram of a control circuit for a motor in accordance with the invention, FIG. 4 the depiction, unrolled, of the rotor magnet for a four-pole motor in accordance with the invention and FIG. 5 an evoluted view of the stator and the rotor of a twelve-slot motor in accordance with the invention, depicted in section.

In FIG. 1 is shown a view of the face of a bundle of laminations of a stator 1 and of a rotor 7 of a four-pole external-rotor-type motor with (the) twelve-slot stator 1. A three-strand stator winding is wound into its slots 2 ($2_1$–$2_{12}$). Each winding strand 3,4,5 is subdivided according to the equation $w=2p$ (with the number of pole pairs $p=2$) into $w=4$ winding sections, whose central axes are arranged in the slots at the periphery of the stator, displaced vis-a-vis one another with a separation of 180° electrical. In this connection the direction of winding is set in such a way that when current flows through the winding strands, four poles arise at the periphery of the bundle of stator laminations, through the division into four winding sections, whose polarity is so directed that North and South poles alternate. The poles formed by the individual winding strands are identified as $S_3$, $N_3$, $S_4$, $N_4$ and $S_5$, $N_5$.

If one views the direction of winding starting from the winding commencement marked A of the winding strand 3, then the wire is led into the drawing plane in the slot $2_4$ ($\oplus$) and led back in the slot $2_1$ ($\odot$). If the number of turns required for this sector of the winding is reached, the second winding step follows in the slots $2_4$ and $2_7$, in process of which the wire now leads likewise away into the slot $2_4$, into the drawing plane $\oplus$ and is led back $\odot$ into the slot $2_7$. After this section of the winding has been executed, the winding of the third section of the winding in the slots $2_7$ and $2_{10}$ and of the fourth section of the winding in the slots $2_{10}$ and $2_1$ follows in a similar manner. As a result of this sort of winding, when current flows through the entire winding strand, a South pole arises on the air gap side between the slots $2_1$ and $2_4$, a North pole between $2_4$ and $2_7$, another South pole between $2_7$ and $2_{10}$, and again a North pole between the slots $2_{10}$ and $2_1$.

The two winding strands 4 and 5 still following exhibit the same individual features, but are accommodated in the slots $2_1$–$2_{12}$ displaced by 120° electrical vis-a-vis one another at any given time.

Figure 2:
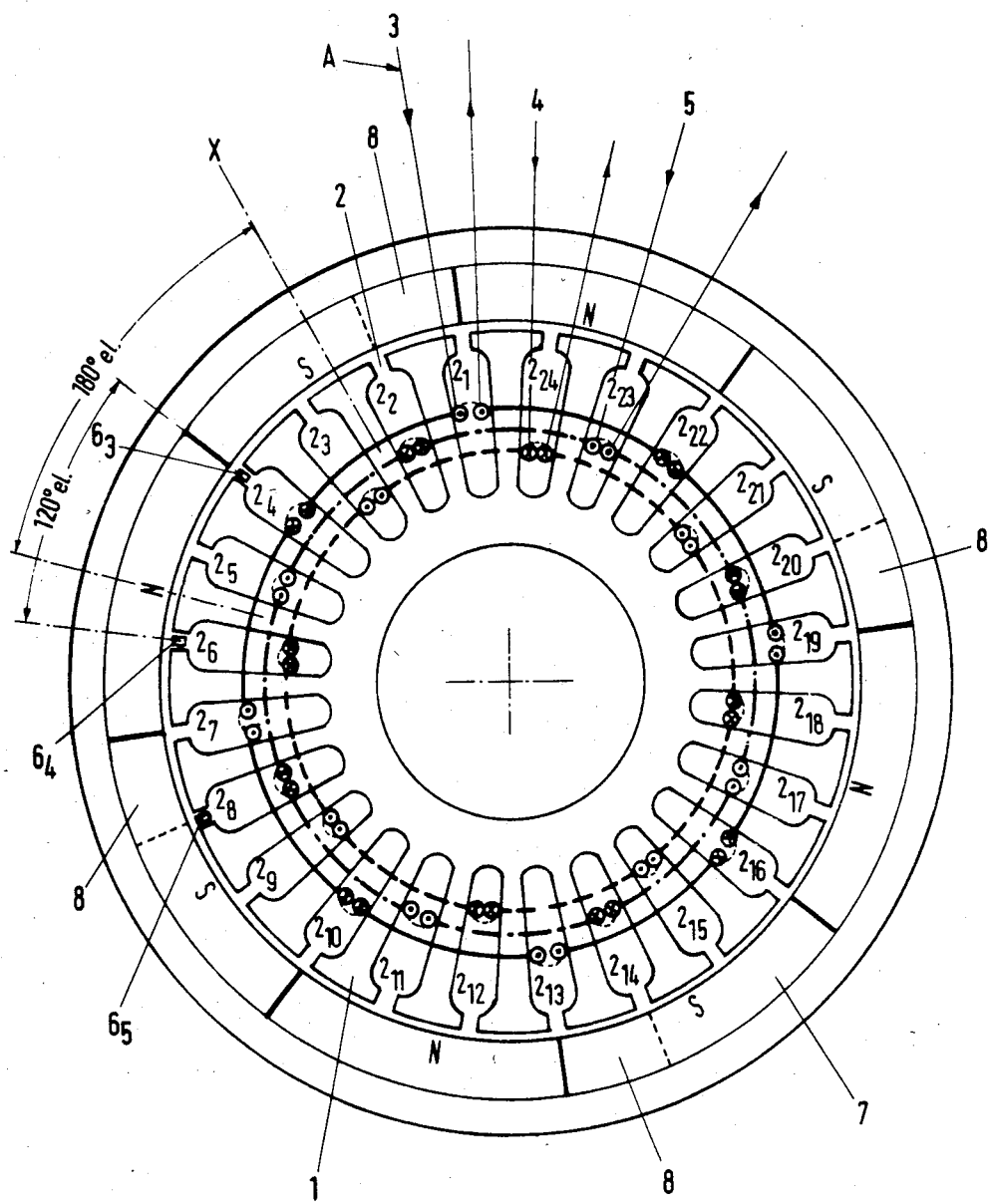

The illustration shown in FIG. 2 deals with the stator 1 of an eight-pole external-rotor-type motor with 24 slots ($2_1$–$2_{24}$). Here too there is a threestrand winding 3,4,5 which is subdivided according to $W=2p$ (with $p=4$) into $W=8$ winding sections, whereby the individual winding sections exhibit an arrangement likewise displaced by 180° electrical vis-a-vis one another. The second winding strand 4 is arranged vis-a-vis the winding strand 3, and the winding strand 5 vis-a-vis the winding strand 4, with a displacement of 120° electrical. Corresponding to the description according to FIG. 1, alternating North and South poles are obtained at the periphery of the bundle of stator laminations when a flow of current arises according to the control of the windings by the Hall-I.C's $6_3$, $6_4$, $6_5$.

Figure 3:
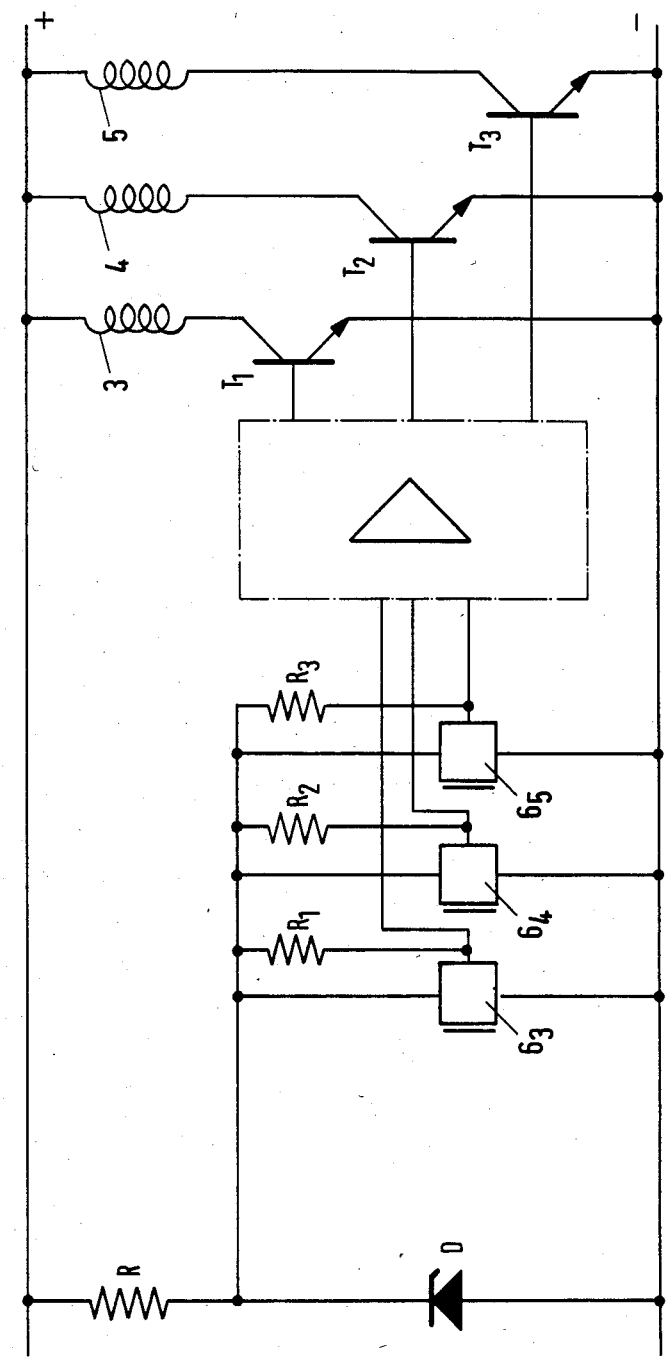

The control of the individual winding strands 3,4,5 is achieved by means of a control circuit depicted in basic form in FIG. 3. The digitally switching Hall-I.C's $6_3$, $6_4$, $6_5$ used in this as rotor position sensors are located either in or on the edge of a slot 2 and are displaced by 120° electrical vis-a-vis one another at any given time. In this connection the arrangement of the Hall-ICS is dependent on their switching action, i.e. on which polarity of a rotor magnet the operation of the Hall-ICs takes place.

If, for example, Hall ICS are used that connect through when a South pole passes by, and which are barred (or blocked off) when a North pole passes by or when no magnetic field is present because of a gap in the magnet, then in a twelve-slot motor (see FIG. 1) the first Hall-I.C $6_3$ is to be fitted in the slot $2_4$.

As already mentioned, viewed from this point onwards the arrangement of the two further Hall-I.C's follows with a separation of 120° electrical at any given time in the direction of revolution of the rotor. This gives a positioning in the slots $2_6$ and $2_8$.

A corresponding modus operandi is obtained if the first Hall-I.C $6_3$ is arranged in the slot $2_{10}$ with subsequent arrangement of the Hall-ICs $6_4$/$6_5$ in the slots $2_{12}$/$2_2$ (all Hall-ICs displaced by 360° electrical).

Figure 4:
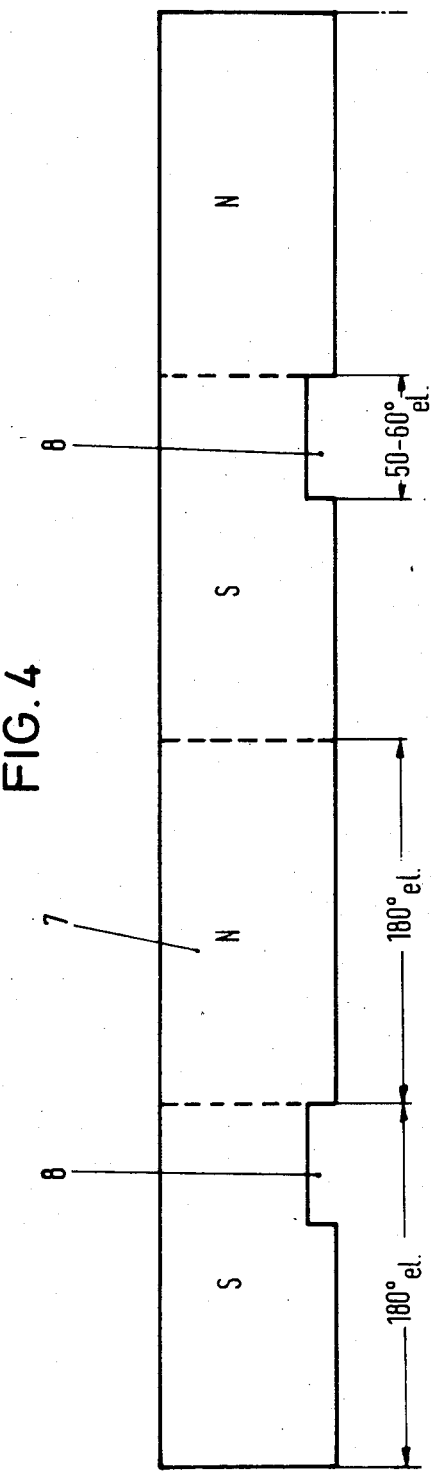

It is advantageous for the performance of the motor if, when Hall-ICs of the kind described above are used, e.g. in a twelve-slot motor, the magnet is cut away or cut out at two points opposite one another, according to FIG. 4. The cutout 8 starts basically, viewed in the direction of rotation, at the beginning of each South pole or the rotor magnet 7, and extends about 50°–60° electrical at the periphery of the South pole. The height of the cutout 8 is in this connection to be of such dimensions that the Hall-I.C is no longer influenced by the magnetic field of the upper part of the rotor magnet.

By means of the configuration according to the invention which has been described, one obtains a uniform flow of torque and good motor efficiency with simple commutation electronics.

Considering the operation of the motor according to the invention (see FIG. 1), and commencing from a starting point of the rotor 7 in which the pole pitch between North and South pole reaches the Hall-I.C H $6_3$, then the Hall-I.C H $6_3$ is connected through by the South pole just beginning. This now brings about the flow of current through winding 3 via interconnected amplifier stages. As already mentioned, a magnetic field arises at the stator air gap with varying polarity from winding sector to winding sector with a South pole btween slot $2_1$ and $2_4$, a North pole between slot $2_4$ and $2_7$, a South pole between slot $2_7$ and $2_{10}$, and again a North pole between slot $2_{10}$ and $2_1$.

Because of the action of force between stator 1 and rotor 7 a turning of the rotor in an counter-clockwise direction takes place. If the Hall-I.C $6_4$ is reached by the South pole of the rotor, the winding 4 is switched on and at approximately the same time the Hall-I.C $6_3$ and with it the winding 3 are switched off by means of the cutout at the South pole of the rotor magnet. Now the South or (as the case may be) North poles $S_4$ $N_4$ arising from the direction of winding of the stator winding 4 lie opposite the South or North poles of the rotor magnet 7, so that as a result of the actions of force that arise, a further rotation takes place. After the Hall-I.C $6_5$ is reached by the South pole of the rotor magnet 7, the winding 5 is switched on, whereupon again by means of the cutout at the South pole of the rotor magnet the switching-off of the winding 4 takes place.

After rotating as far as the start of the first half-revolution of the rotor, the winding 3 is now switched on again, whereupon the winding 5 is switched off at roughly the same time.

Now the switching-on sequence is repeated in the way already described, so that in this manner two current impulses per rotor revolution are delivered to each individual winding 3,4,5, and therewith, looking at the three winding strands 3,4,5 as a whole, six-pulse operation is seen.

The method of operation of the motor according to FIG. 2 with a 24-slot stator 1 is analogous to that in FIG. 1. Here, the individual winding strands 3,4 and 5 are subdivided into W=8 individual windings according to the formula $W=2p$ (with p=4 pairs of poles of the rotor magnet) consistent with the invention. This has the consequence that when current flows through a winding strand 3,4,5 four North and South poles each arise at the bundle of stator laminations. To this distribution corresponds the number of pairs of poles of the rotor magnet 7 ) which here too is provided with a cutout 8 of about 50°–60° electrical in each South Pole. With this embodiment of the motor, a twelve-pulse operation is obtained, which is associated with an increased stability of the rate of revolutions and of the torque, and at the same time with a reduction of the bearing load. This twenty-four-slot motor finds application primarily for relatively low rates of revolution.

Figure 5:
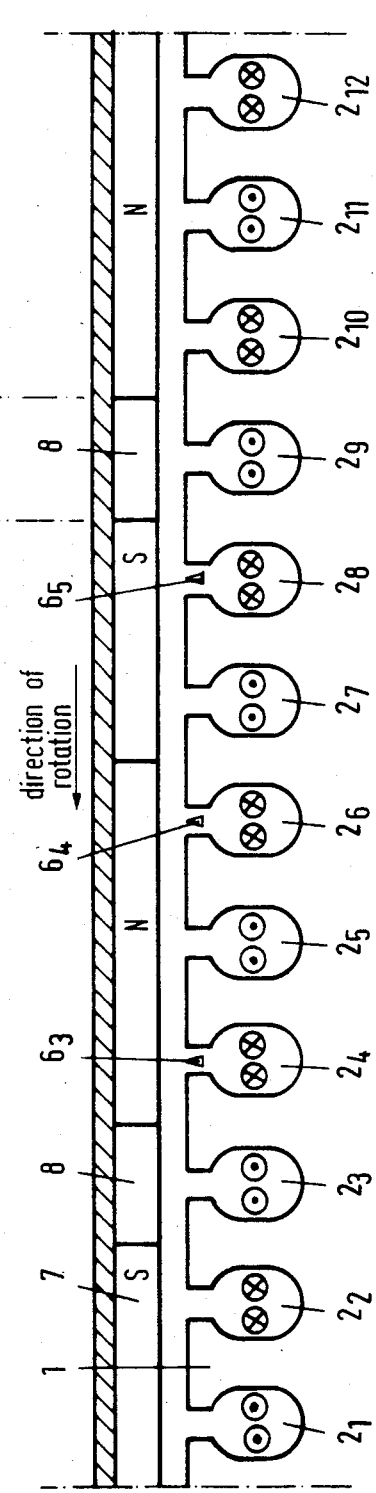

FIG. 5 shows in an evoluted representation the stator 1 of a twelve-slot motor, according to the invention, with the slot openings $2_1$–$2_{12}$ and the wrappedin windings 3,4 and 5. The Hall-I.C's $6_3$, $6_4$,$6_5$ are accommodated in slot $2_4$ to switch winding 3, in slot $2_6$ in order to switch winding 4, and in slot $2_8$ to switch winding 5.

We claim:

1. Commutatorless D.C. motor with cylindrical air gap and having a stator with three stator winding strands displaced by 120° electrical and with a permanent-magnetic external rotor with at least p=1 pairs of poles and with $N=2p\times 3$ winding slots in the stator, and with at least two rotation position detectors comprising Hall generators operatively connected to switch on and off the individual winding strands depending on the rotational position of the rotor, characterized in that:

the rotor has p=2 or p=4 pairs of poles; the stator windings are full pitch and are located within the stator slots, each winding strand is subdivided into $W=2p$ winding sections, whose central axes exhibit a separation of 180° electrical, viewed in the direction of rotation, and the direction of winding of the winding sections is such that at the periphery of the stator alternating North and South poles, viewed in the direction of rotation, are produced by the winding sections.

2. A D.C. motor according to claim 1, wherein, for each winding strand, one of said Hall generators is connected in operative relation to selectively control current flow therein, a first one of the Hall-ICs, connected to the first winding strand is fitted in the stator slot whose mean separation from the central axis X of the first winding section of the first winding strand (3) amounts to 90° electrical, and the second and third Hall-ICs at any given time are fitted in stator slots further displaced vis-a-vis one another by 120° electrical in the direction of rotation.

3. A D.C. motor according to claim 1 wherein at any given time only adjoining winding sections of the same winding strand (3,4,5) are wrapped into the slots ($2_1$–$2_{12}$; $2_1$–$2_{24}$) in the same direction.

4. A D.C. motor according to claim 2, wherein the magnet of the rotor contains cut-outs which, viewed in the direction of rotation, start at the beginning of each South or North pole and extend approximately 50°–60° from the beginning of the pole at the periphery of the same, and the radial height of the cut-outs is dimensioned so that the magnetic field of the part of the rotor magnet radially above the cut-out does not operate the Hall ICs fitted on the stator side, whereby current through the respective windings is selectively interrupted by operation of the respective ICs in response to rotational alignment of a cut-out with the IC.

* * * * *